United States Patent Office 2,957,456
Patented Oct. 25, 1960

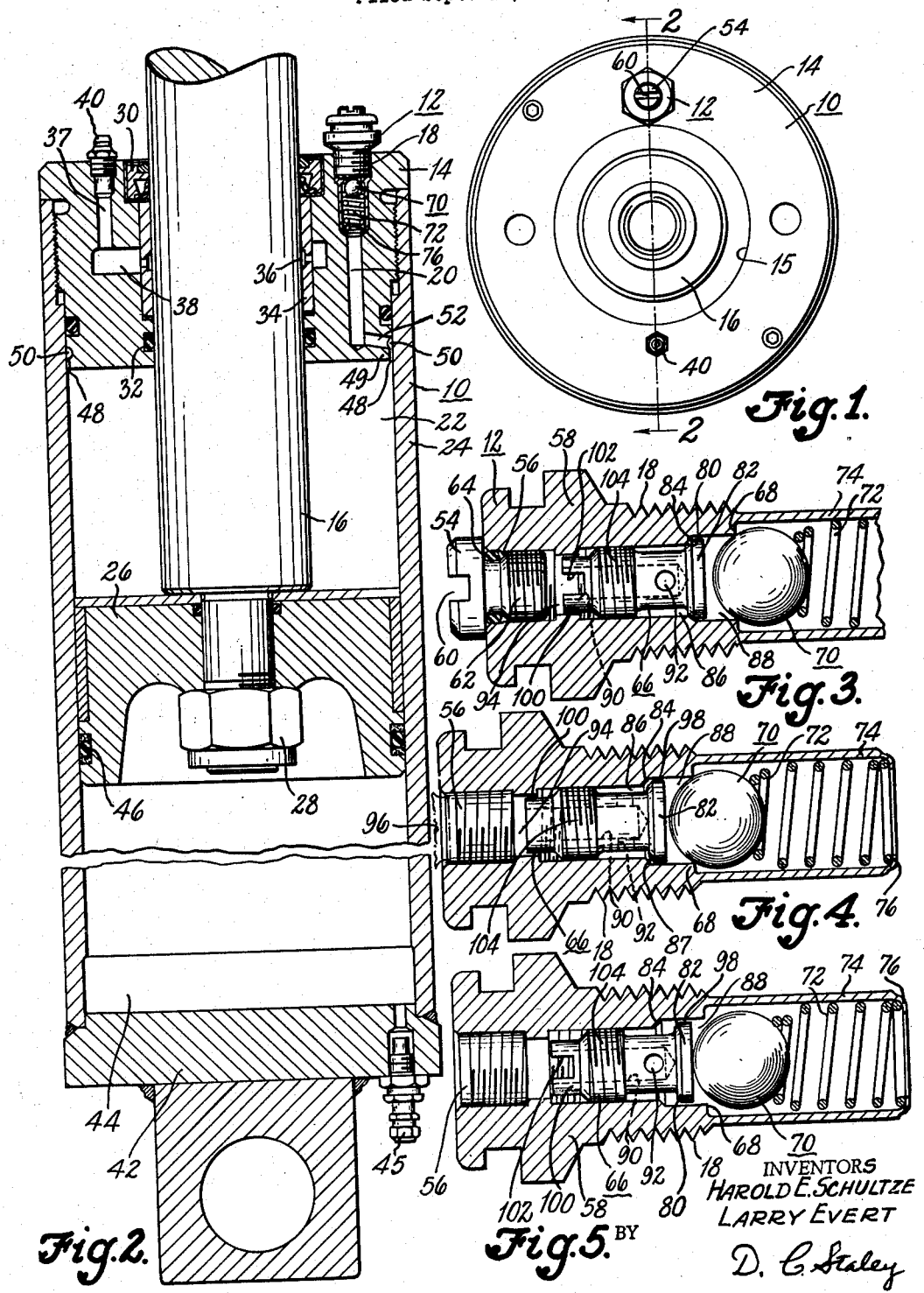

2,957,456
GREASE DEVICE

Harold E. Schultze, Dayton, and Lawrence L. Evert, Euclid, Ohio, assignors to General Motors Corporation, Detroit, Mich., a corporation of Delaware Filed Sept. 16, 1957, Ser. No. 684,035

6 Claims. (Cl. 121—123)

This invention relates to a device for retention, filling and bleeding of a flowable material, and, more particularly, a grease fitting capable of providing these multiple functions.

An object of this invention is to provide a new and improved grease fitting.

Another object of this invention is to provide a unitary device permitting greasing of a cavity under pressure, containing grease in the cavity and also bleeding of the grease when desired.

Another object of this invention is to provide a grease fitting with means for permitting multiple functions of filling, retaining and bleeding of a flowable material such as grease relative to a cavity for use in combination with a gas spring actuator.

Another object is to provide a grease fitting having triple seals including a ball check, a cock screw and a plug capable of permitting multiple functioning of filling, retaining and bleeding of grease relative to a cavity.

Another object is to provide a grease fitting having three seals including a ball check provided for an internal valve seat of the fitting, a cock screw threadedly engaged into an intermediate portion of the fitting capable of being turned to dislodge the ball check from the seat and having a through passage for grease as well as an additional sealing portion engageable with an intermediate seat of the fitting, and a plug attachable to the fitting at one end thereof.

Further objects and advantages of the present invention will be apparent from the following description, reference being had to the accompanying drawings wherein a preferred embodiment of the present invention is clearly shown.

In the drawings:

Figure 1 is an end view of an actuator or gas spring device incorporating a multiple function grease fitting in accordance with the present invention.

Figure 2 is a cross-sectional view taken along line 2—2 of Figure 1.

Figure 3 is an enlarged cross-sectional fragmentary view of the grease fitting shown in the actuator of Figure 2 with parts of the grease fitting shown positioned to provide functioning for retention of grease in a cavity.

Figure 4 is an enlarged cross-sectional view with parts of the grease fitting of Figure 3 positioned as during grease-filling functioning thereof.

Figure 5 is an enlarged cross-sectional view with parts of the grease fitting of Figure 3 positioned as during grease bleeding functioning.

With particular reference to Figure 1, there is shown a gas spring actuator, generally indicated by the numeral 10, having a grease fitting 12 attached thereto. The actuator 10 has an end cap 14 with a central opening 15 through which a rod 16 is reciprocally movable. The grease fitting 12 is attached to the end cap 14 and has parts or elements more clearly visible in the cross sectional view of Figures 2 through 5. The fitting 12 is attached by threads 18 to the end cap 14 so that a passage 20 in the end cap can form part of a communicating path between the fitting 12 and the cavity 22. The cavity 22 is formed inside the actuator 10 by a cylindrical housing 24 together with the end cap 14 and a piston 26 reciprocally movable inside the housing 24. The rod 16 is suitably attached by means such as a flexible lip seal 30 and an O-ring 32 located with the end cap 14 in a conventional manner. A bushing 34 with lubricating passages 36 supports the rod 16 relative to the end cap 14. A conventional grease fitting 40 of the Alemite or Zerk type is provided at passage 37 with the end cap to supply lubricating oil to an annular space 38 and passages 36. A cover member 42 is secured to the housing 24 opposite the end cap 14. A gas pressure chamber 44 is formed between the piston 26, housing 24, and cover member 42 and preferably is filled with a preloaded gas charge through a conventional fitting 45 secured to the cover member 42. The fitting 45 may also be connected with an accumulator or other source of gas under pressure so that the piston 26 is always subject to fluid pressure from the chamber 44 urging movement of the piston 26 toward the end cap 14.

The actuator 10 is preferably used for purposes of resiliently moving a load attached to the rod 16 in an extend direction as urged by the gas pressure in chamber 44 as governed or controlled by a flowable material such as grease which is retained, filled, or bled through the grease fitting 12 of the present invention relative to the cavity 22. Conventional sealing means 46 are provided with the piston 26 relative to housing 24 but some leakage of gas under pressure from chamber 44 can occur into cavity 22. This leakage of gas under pressure is urged toward an annular restrictive space 48 formed between an annular flange 49 of end cap 14 and an inner surface of the cylindrical housing 24 of the actuator. It is to be understood that both this leakage gas under pressure and grease or other flowable material in cavity 22 is passable through the restricted space 48 to an annular recess 50 which is connected through a lateral passage 52 with the conduit or passage 20 communicating adjacent the grease fitting 12 of the present invention.

The grease fitting 12 as seen in Figure 3 includes a first means 54 for sealingly engaging opening 56 at one end of a body portion 58 of the fitting 12. This first sealing means 54 is a plug having a head-slot portion 60 and a reduced-diameter, externally-threaded portion 62 adapted to engage an inner threaded periphery of the opening 56 to cause a sealing ring 64 to be squeezed for sealing purposes against the opening 56. This first sealing means 54 maintains the opening 56 closed at times other than during filling and bleeding of a flowable material through the grease fitting 12 into cavity 22 and, thereby, assures retention of material in cavity 22. The body portion 58 of fitting 12 also threadedly receives an intermediate movable member or cock screw 66 which functions to permit filling and bleeding of grease as will become apparent below. The body portion 58 further provides an annular seat 68 for a check valve means including a ball generally indicated by numeral 70. The ball 70 is biased into engagement with the seat 68 due to force from a spring means 72 disposed between one side of the ball 70 and a cylindrical skirt portion 74 of body portion 58 of fitting 12. The end of the skirt portion 74 is crimped over as shown at 76 in Figures 2, 4 and 5 to form an annular engaging flange for support of the spring means 72.

Referring to Figure 3, the plug 54 is shown threadedly engaging the body portion 58 at opening 56 such that sealing ring 64 provides a positive retaining seal for any flowable material contained in the cavity 22. The parts of the grease fitting as shown in Figure 3 are representative of a retaining position of parts of the grease fitting for maintaining the flowable material in the cavity 22 and therefore, the plug 54 is shown in place. In this retaining position the intermediate movable member 66 is so placed that a conical seat portion 80 formed on a laterally extending flange 82 of the intermediate member 66 is firmly in sealing engagement with a conical seat 84 internally formed intermediate the ends of body portion 58. When sealing is effected between the conical seat 84, any communication between a space 86 in an intermediate portion of the body portion 58 is prevented relative to a space 88 between the ball 70 and intermediate member or cock screw 66. It is best seen in Figures 3, 4 and 5 how a passage 90 extending longitudinally in the cock screw 66 communicates with lateral passages 92 for establishing a conduit between space 86 and a recess 94 between the opening 56 at opposite ends of intermediate member or cock screw 66. In effect the retaining position as maintained by the grease fitting 12 of the present invention involves a triple seat including a first seal provided by the plug 54 and O-ring 64, a second seal provided by engagement of conical portion 80 of cock screw 66 against conical seat 84, and a third seal provided by engagement of ball 70 against seat 69 as effected by the spring 72 referred to above.

Figure 4 shows the grease fitting 12 of the present invention with parts in relationship to each other for a filling operation through the fitting to inject flowable material into cavity 22 by way of passage 20-52-50-48 in Figure 2. As seen in Figure 4 the plug 54 has been removed and a phantom representation of a supply fitting 96 is shown adjacent the opening 56 so that a flowable material is supplied to space 94 and can flow through the longitudinal passage 90 and lateral passages 92 of the cock screw into space 86, into an opening 87 between the conical seat 84 and conical portion 80 around a restrictive passage 98 formed between an outer periphery of flange 82 and an inner wall of body portion 58 to the space 88 under pressure causing the ball 70 to be momentarily unseated from seat 68 against the force of spring 72 and then through the passages in the end cap 14 to the cavity 22. At the time when flowable material is filled through the grease fitting in the present invention into cavity 22 the volume of material in cavity 22 is increased and the piston 26 is moved to effect retraction of the rod 16 relative to its load, whatever the load may be, such that gas pressure in chamber 44 permits resilient retraction of piston 26 and rod 16. The piston 26 is maintained in firm engagement relative to the grease or flowable material in the cavity 22 due to the pressure from gas in chamber 44 as exerted on the piston 26. The ball 70 is momentarily unseated during supply of flowable material under pressure from the opening 56 and the flowable material can be continuously supplied to the cavity 22 until the pressure of gas in chamber 44 balances or is equal to the pressure being used to supply the flowable material. However, in the event that there should be an interruption or failure of the pressure supplying flowable material to cavity 22 during the filling as permitted by the parts positioned in Figure 4, the ball 70 will instantaneously reengage seat 68 to provide a checking action preventing undesired leakage or bleeding of flowable material from cavity 22. It should be noted that the ball check feature is conventional with grease fittings and that the function of filling a cavity using such a ball check is well known in the art. However, the cock screw 66 or intermediate sealing means provides a safety feature in conjunction with the present invention whereby the ball 70 cannot be unseated in any way except for specific bleeding purposes as will be described below.

The cock screw or intermediate sealing means 66 has a slotted end portion 100 adapted to receive a tool such as a screw driver in slot 102 for rotative movement of the intermediate sealing means relative to the threads 104 provided at an intermediate inner portion of the body portion 58. Depending upon whether these are right or left hand threads a clockwise or counterclockwise rotative movement of the cock screw 66 effected through engagement of a tool with slot 102 will cause sealing engagement between the conical portion 80 and conical seat 84 or an unseating thereof in keeping with the functions of the fitting of the present invention. Figure 3 as described above represents a retaining or fully sealing relationship of the parts in the fitting 12 and as noted Figure 4 represents the positioning after rotation of the cock screw 66 partially toward ball 70 for performing the fill function using the fitting 12 of the present invention. In the filling position as represented by Figure 4 the radially extending flange portion 82 with the conical portion 80 of the cock screw 66 is located in a position intermediate but not engaging either conical seat 84 or ball check 70. This position of the cock screw 66 assures proper filling with the safety feature of the ball check unhindered or unobstructed from seating engagement with seat 68 during the filling operation. Thus, any interruption or failure in the pressure used to supply flowable material to cavity 22 will be met with an immediate checking action from the ball check and consequent avoidance of any bleeding or leakage of flowable material already forced into the cavity 22.

Figure 5 shows the grease fitting 12 of the present invention with the parts thereof positioned for bleeding of flowable material from the cavity 22 out of the actuator 10 by way of the grease fitting 12. For this function of the fitting, the plug 54 is also not in position relative to the opening 56 of body portion 58 and the phantom of a fitting 96 is also removed so that a tool or screw driver has been inserted into engagement with slot 102 to effect rotation of cock screw 66 to a position remote from the conical seat 84 whereby the lateral flange or head portion 82 of the cock screw positively engages and unseats the ball 70 from seat 68. Referring to Figure 2, flowable material can now escape from cavity 22 by way of the restricted passage 48 and recess 40 through passages 52 and 20 in the end cap 14 around the ball 70 by way of space 88 and restrictive passage 98 to space 86 and through lateral passages 92 on one side of head portion 82 to longitudinal passage 90 to be exhausted as waste through the opening 56 of body portion 58. During this bleed positioning of parts, the flowable material or grease in cavity 22 is urged out of the actuator 10 due to pressure exerted on piston 26 from gas in the chamber 44. Any gas from chamber 44 which may have leaked around piston 26 in grease cavity 22 is bled off first due to the arrangement of restrictive passage 48 and recess 50 for collecting such gas in a location separate from the grease cavity adjacent the grease fitting 12.

It is apparent that the unitary fitting of the present invention provides parts capable of being positioned for permitting the functions of retaining, filling, or bleeding of flowable material or grease into a cavity as explained above. The unitary fitting in accordance with the present invention eliminates the use of separate fittings for separate purposes and provides a unitary structure effecting a savings in the cost of materials and labor in making an actuator or any other device having a cavity into which a flowable material must be filled, contained or bled off according to the needs of the particular use to which the actuator or other device is being applied.

While the embodiment of the present invention as herein disclosed constitutes a preferred form, it is to be understood that other forms might be adopted.

What is claimed is as follows:

1. A unitary fitting for retaining, filling, and bleeding a flowable material such as grease, comprising, a one-piece annular body portion having an opening at one end, a valve seat formed near an opposite end of said fitting, an intermediate seating portion formed inside said body portion, intermediate the ends thereof, a plug sealingly engageable in the opening of said body portion when said fitting retains the flowable material against passage from end to end through said one-piece annular body portion at times other than during filling and bleeding, a cock screw means having a head portion sealingly engageable with said intermediate seating portion, said cock screw means being located in said one-piece annular body portion intermediate the opening and valve seat, and a ball check means normally resiliently engaged against said valve seat, said cock screw means being rotatable to effect longitudinal movement of the head portion out of engagement with said intermediate seating portion to permit filling of flowable material in one direction through a central longitudinal passage of said cock screw means to unseat said ball check means momentarily due to force extended by means of the flowable material when said plug is removed from the opening, said cock screw being also movable positively to engage said ball check means positively dislocating said ball check means from said valve seat to permit bleeding of flowable material to pass in an opposite direction by way of the same passage in said cock screw means through said fitting.

2. The fitting of claim 1 wherein said intermediate seating portion comprises, a conically-shaped section internally formed at a location intermediate the ends of said one-piece annular body portion and spaced a predetermined distance from said valve seat, and the head portion of said cock screw means has a conical portion sealingly cooperable and complementary relative to said conically-shaped section.

3. A unitary grease fitting for retaining, filling, and bleeding a flowable material such as grease, comprising, a one-piece annular body portion having an opening at one end, a valve seat formed near an opposite end of said fitting, an intermediate seating portion formed inside said body portion intermediate the ends thereof, a plug sealingly engageable in the opening of said body portion when said fitting retains the flowable material at times other than during fill and bleeding, a cock screw means having a head portion laterally extending flange sealingly engageable with said intermediate seating portion, said head portion laterally extending flange being movable with said cock screw means to a position away from said seating portion to form a restricted annular passage peripherally between said head portion laterally extending flange and the inner annular surface of said body portion providing for communication between space on opposite sides of said head portion laterally extending flange, said cock screw means having a central longitudinal passage normally in communication with space on one side of said head portion laterally extending flange and space adjacent the opening at one end of said one-piece annular body portion, and a ball check means normally resiliently engaged against said valve seat, said cock screw means being rotatable to effect longitudinal movement of said head portion laterally extending flange out of engagement with said intermediate seating portion to permit filling of flowable material in one direction through a longitudinal passage of said cock screw means to unseat said ball check means momentarily under pressure exerted by means of the flowable material when said plug is removed from the opening, said cock screw being also movable positively to engage said ball check means positively dislocating said ball check means from said valve seat to permit bleeding to flowable material to pass in an opposite direction by way of the same passage in said cock screw means through said fitting.

4. For use in an actuator having a housing closed at opposite ends by end caps, a piston reciprocably movable in said housing and dividing said housing into a gas pressure chamber on one side and a cavity for flowable material such as grease on an opposite side, a single device, comprising, a unitary grease fitting adapted for multi-function use in filling, bleeding, and retention of a flowable material relative to the cavity including, a one-piece annular body portion of said fitting attached to one end cap adjacent to a passage connected to a recess formed between the end cap and the housing for accumulation of leakage gas immediately adjacent to said unitary fitting, the recess communicating through an annular restrictive passage provided between one of said end caps and the housing for assurance of separation of leakage gas at a location separated though adjacent to the cavity for flowable material, means for sealingly engaging an opening at one end of said one-piece annular body portion and removable from said body portion during bleeding and filling of flowable material through said fitting to the cavity, means movable from a sealing position located intermediate the ends inside said one-piece annular body portion and providing passage for first the leakage gas and next the flowable material in one direction whenever moved from the sealing position, and check valve means as part of said single device said resiliently engageable in a sealing position located at an end of said body portion opposite the opening and momentarily dislodged from sealing position during filling of flowable material to the cavity in an opposite direction through the same passage of said intermediately-located movable means, said check valve means being positively dislocated from sealing position by engagement of said intermediately-located movable means with said check valve means for permitting bleeding of the flowable material from the cavity using said same grease fitting, the annular restrictive passage and recess permitting any gas which may leak around said piston to the grease cavity always to be bled through said grease fitting first.

5. A single multi-function grease device for retention, filling, and bleeding of a flowable material such as grease and the like, comprising, a one-piece unitary hollow body portion including an integral cylindrical skirt terminating at an opening at one end of said one-piece unitary hollow body portion, an annular seat provided inside said body portion immediately adjacent to an end remote from the opening at one end of said integral cylindrical skirt, a ball provided in space within said annular skirt, an inwardly crimped end portion of said skirt adjacent to the opening at one end thereof, a spring means disposed between said inwardly crimped end portion of said skirt and said ball biased normally into sealing engagement with said annular seat, a conically-shaped seat portion formed along an inner periphery of said hollow unitary body portion intermediate said annular seat and an opening at an end of said hollow body portion remote from said integral cylindrical skirt and the first mentioned opening, an intermediate movable member threadedly engageable with a complementary inner periphery of said hollow one-piece body portion and having a passage extending longitudinally therein to a lateral passage thereof, the passages in said intermediate movable member providing communication between a recess and a space at opposite ends thereof, a head portion including a laterally extending flange formed integrally with said intermediate movable member, a conical seat-engaging portion formed on said laterally extending flange and adapted to complement said conical seat portion in sealing relation thereto, said laterally extending flange and said unitary hollow body portion forming a restrictive passage therebetween inside said fitting body portion and adapted for communicating between space within said cylindrical skirt portion and space adjacent to one side of said head portion where the passages in said intermediate movable member terminate, a plug insertable in the opening remote from said integral cylindrical skirt portion, and an end of said intermediate movable member accessible for use in effecting turning of said movable member upon removal of said plug, said intermediate movable member being adapted to be positioned longitudinally within said hollow unitary body portion such that said conical seat engaging portion of said laterally extending head portion flange is spaced away from said conically-shaped seat portion so as to open communication to the restrictive passage between said laterally extending flange and the inner periphery of said body portion but out of engagement with said ball which is adapted to be dislocated resiliently from said annular seat during filling of flowable material in one direction, said intermediate movable member being adapted to be positioned so that said integral head portion abuts against and positively dislocates said ball from said annular seat to permit communication for bleeding flowable material in an opposite direction between opposite ends through the same restrictive passage between said laterally extending flange and inner periphery of said unitary body portion by way of the passages in said intermediate movable member wholly inside said one-piece unitary body portion.

6. In an actuator having a housing closed at opposite ends by end caps, a piston reciprocably movable in the housing divided by the piston into a gas pressure chamber on one side and a cavity for flowable material such as grease on an opposite side, the improvement which comprises having a single fitting adapted for multi-function use in filling, bleeding, and retention of a flowable material relative to the cavity, said single fitting including, a one-piece annular body portion of said fitting attached to one end cap adjacent to a passage connected to a recess formed between the end cap and the housing, the recess providing space for accumulation of gas leaked into the flowable material around the piston and collected in the recess at a location adjacent to said single fitting, the recess communicating through an annular restrictive passage provided between one of the end caps and the housing for assurance of separation of leakage gas at a location separated though adjacent to the cavity for flowable material, means for sealingly engaging an opening at one end of said one-piece annular body portion and removable from said body portion during bleeding and filling of flowable material through said fitting to the cavity, means movable from a sealing position located intermediate the ends inside said one-piece annular body portion and providing passage for first the leakage gas and next the flowable material in the one direction whenever moved from the sealing position, and check valve means as part of said single fitting and resiliently engageable in a sealing position located at an end of said body portion opposite the opening and momentarily dislodged from sealing position during filling of flowable material to the cavity in an opposite direction through the same passage of said intermediately-located movable means, said check valve means being positively dislocated from sealing position by engagement of said intermediately-located movable means with said check valve means for permitting bleeding of the flowable material in one direction from the cavity using said same single fitting and passage in said intermediately-located movable means, the annular restrictive passage and recess permitting any gas which leaks around the piston to the cavity to be bled through said single fitting first.

References Cited in the file of this patent

UNITED STATES PATENTS

| | | |
|---|---|---|
| 1,565,913 | Dosker | Dec. 15, 1925 |
| 1,753,849 | Buchet | Apr. 8, 1930 |
| 1,857,940 | Chouinard | May 10, 1932 |
| 1,878,115 | De Cosse | Sept. 20, 1932 |
| 2,059,629 | Erwin | Nov. 3, 1936 |
| 2,361,866 | Norway | Oct. 31, 1944 |
| 2,438,776 | Boylan | Mar. 30, 1948 |

FOREIGN PATENTS

| | | |
|---|---|---|
| 915,736 | France | 1946 |
| 998,160 | France | 1951 |